US012640432B2

(12) United States Patent
Chen et al.

(10) Patent No.: US 12,640,432 B2
(45) Date of Patent: May 26, 2026

(54) BATTERY TRAY AND BATTERY FORMATION AND CAPACITY-GRADING DEVICE

(71) Applicant: CONTEMPORARY AMPEREX TECHNOLOGY (HONG KONG) LIMITED, Hong Kong (CN)

(72) Inventors: Jian Chen, Ningde (CN); Kexin Sun, Ningde (CN); Chaokun Wang, Ningde (CN); Yiyang Lin, Ningde (CN); Xuexi Zhang, Ningde (CN); Guoqiang Huang, Ningde (CN); Changjian Shi, Ningde (CN); Zushuang Xue, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 300 days.

(21) Appl. No.: 18/621,156

(22) Filed: Mar. 29, 2024

(65) Prior Publication Data

US 2024/0243412 A1     Jul. 18, 2024

Related U.S. Application Data

(63) Continuation of application No. PCT/CN2022/109486, filed on Aug. 1, 2022.

(30) Foreign Application Priority Data

May 25, 2022     (CN) .......................... 202221260503.9

(51) Int. Cl.
*H01M 50/267* (2021.01)
*H01M 10/04* (2006.01)
(Continued)

(52) U.S. Cl.
CPC ......... *H01M 50/267* (2021.01); *H01M 10/04* (2013.01); *H01M 50/256* (2021.01);
(Continued)

(58) Field of Classification Search
CPC .. H01M 10/04; H01M 10/052; H01M 10/058; H01M 50/209; H01M 50/244;
(Continued)

(56) References Cited

FOREIGN PATENT DOCUMENTS

| | | |
|---|---|---|
| CN | 205944298 U | 2/2017 |
| CN | 206788332 U | 12/2017 |

(Continued)

OTHER PUBLICATIONS

International Search Report and Written Opinion mailed on Feb. 20, 2023, received for International Application No. PCT/CN2022/109486, filed on Aug. 1, 2022, 8 pages including English Translation.

(Continued)

*Primary Examiner* — Lingwen R Zeng
(74) *Attorney, Agent, or Firm* — XSENSUS LLP

(57) ABSTRACT

This application discloses a battery tray and a battery formation and capacity-grading device. The battery tray includes a fixed frame; and a fixed component located in the fixed frame, the fixed component including a first limiting assembly and a second limiting assembly, the first limiting assembly including at least two first limiting members which extend along a first direction respectively and are spaced apart along a second direction which intersects the first direction, the second limiting assembly being connected to the first limiting assembly and including at least two second limiting members which are disposed along the first direction and are connected with the first limiting members to form a limiting space for accommodating a battery cell, and (Continued)

the second limiting members being movably disposed along the first limiting members in the first direction.

11 Claims, 7 Drawing Sheets

(51) Int. Cl.

| | |
|---|---|
| *H01M 50/256* | (2021.01) |
| *H01M 10/052* | (2010.01) |
| *H01M 10/058* | (2010.01) |
| *H01M 50/209* | (2021.01) |
| *H01M 50/244* | (2021.01) |
| *H01M 50/264* | (2021.01) |

(52) U.S. Cl.
CPC ........ *H01M 10/052* (2013.01); *H01M 10/058* (2013.01); *H01M 50/209* (2021.01); *H01M 50/244* (2021.01); *H01M 50/264* (2021.01); *Y02E 60/10* (2013.01); *Y02P 70/50* (2015.11)

(58) Field of Classification Search
CPC ............. H01M 50/256; H01M 50/264; H01M 50/267; Y02E 60/10; Y02P 70/50
See application file for complete search history.

(56) References Cited

FOREIGN PATENT DOCUMENTS

| | | | | |
|---|---|---|---|---|
| CN | 207417434 | U | | 5/2018 |
| CN | 108539279 | A | | 9/2018 |
| CN | 208400972 | U | | 1/2019 |
| CN | 208478422 | U | | 2/2019 |
| CN | 209592203 | U | | 11/2019 |
| CN | 209822729 | U | | 12/2019 |
| CN | 209973045 | U | * | 1/2020 |
| CN | 210723257 | U | | 6/2020 |
| CN | 212062503 | U | | 12/2020 |
| CN | 212392322 | U | | 1/2021 |
| CN | 216085187 | U | | 3/2022 |
| JP | 2015-091714 | A | | 5/2015 |
| KR | 20150144608 | A | | 12/2015 |
| WO | 2020/162661 | A1 | | 8/2020 |

OTHER PUBLICATIONS

Extended European Search Report issued Jan. 28, 2025 in European Patent Application No. 22943379.2.

* cited by examiner

122
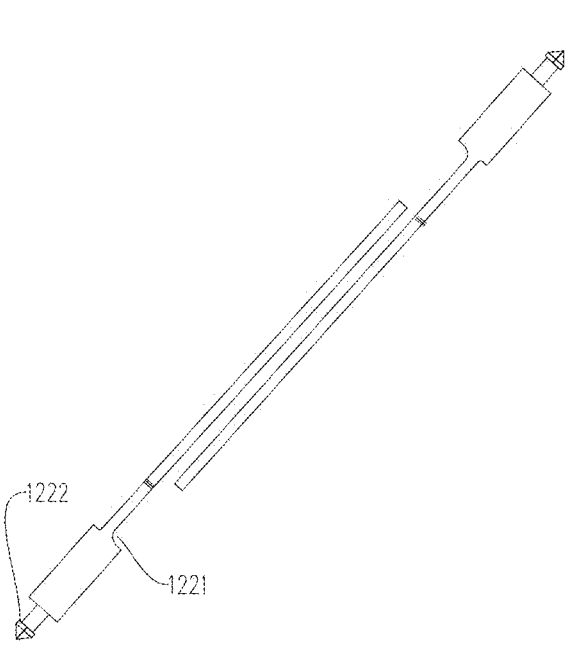
1222
1221
Fig. 3
122
1223
1222
Fig. 4

BATTERY TRAY AND BATTERY FORMATION AND CAPACITY-GRADING DEVICE

CROSS-REFERENCE TO RELATED APPLICATIONS

This application is a continuation of International Application No. PCT/CN2022/109486, filed on Aug. 1, 2022, which claims priority of Chinese Patent Application No. 202221260503.9, filed on May 25, 2022, both of which are hereby incorporated by reference in their entireties.

TECHNICAL FIELD

This application relates to a field of batteries, and in particular to a battery tray and a battery formation and capacity-grading device.

BACKGROUND

Lithium batteries have advantages such as high specific energy, a large number of cycle service times, and long storage time. With the development of new energy technology, lithium batteries are increasingly widely used. During the production and manufacture of the lithium batteries, they usually need to be moved between multiple equipment and workstations in order to perform corresponding operations on the batteries. Therefore, there is a need for a transfer tool for driving the batteries to move between different equipment and workstations.

SUMMARY

This application provides a battery tray and a battery formation and capacity-grading device, which can improve the compatibility and versatility of the battery tray, save replacement time and costs, and improve work efficiency.

In a first aspect, an embodiment of this application provides a battery tray, including a fixed frame; and a fixed component located in the fixed frame, the fixed component including a first limiting assembly and a second limiting assembly, the first limiting assembly including at least two first limiting members which extend along a first direction respectively and are spaced apart along a second direction which intersects the first direction, the second limiting assembly being connected to the first limiting assembly and including at least two second limiting members which are disposed along the first direction and are connected with the first limiting members to form a limiting space for accommodating a battery cell, and the second limiting members being movably disposed along the first limiting members in the first direction.

According to an aspect of an embodiment of this application, the second limiting assembly includes two second limiting members spaced apart to form the limiting space.

According to an aspect of an embodiment of this application, the two second limiting members at least partially overlap along a third direction which intersects the first direction and the second direction.

According to an aspect of an embodiment of this application, an avoidance groove is formed on at least one of the two second limiting members, and at least a portion of one of the two second limiting members is located in the avoidance groove of the other of the two second limiting members.

According to an aspect of an embodiment of this application, the two second limiting members forming the limiting space are connected to different first limiting members, respectively.

According to an aspect of an embodiment of this application, the fixed component further includes an adjustment portion through which a plurality of second limiting members are connected to at least one of the first limiting members, and the adjustment portion is movably disposed along the first direction relative to the first limiting members so as to drive the second limiting members to move along the first direction through the adjustment portion.

According to an aspect of an embodiment of this application, there are two adjustment portions which are configured to drive the plurality of second limiting members to be connected to respective first limiting members, respectively, such that the plurality of second limiting members is capable of moving in opposite directions along the first direction.

According to an aspect of an embodiment of this application, the fixed component further includes an adjustment mechanism which is configured to drive the adjustment portion to move along the first limiting members, the adjustment mechanism includes a fixed portion fixedly connected to the first limiting members and a sliding portion fixedly connected to the adjustment portion, and the fixed portion and the sliding portion are relatively movably disposed along the first direction such that the sliding portion is capable of driving the adjustment portion to move.

According to an aspect of an embodiment of this application, the adjustment portion is provided with a through groove in which the fixed portion is located and fixedly connected to the first limiting member.

According to an aspect of an embodiment of this application, the fixed portion and the sliding portion are connected by a screw or by a restoring member which is deformable reciprocally along the first direction.

According to an aspect of an embodiment of this application, the second limiting members and the adjustment portion are disposed on two sides of the first limiting members in the second direction, respectively, and a connecting component configured to connect the adjustment portion is disposed on the second limiting members; and a first waist hole extending along the first direction is disposed on the first limiting members, and the connecting component is connected to the adjustment portion through the first waist hole.

According to an aspect of an embodiment of this application, a position of at least one of the first limiting members relative to the fixed frame along the second direction is adjustable.

According to an aspect of an embodiment of this application, the fixed frame includes a bottom portion and a side portion connected to a peripheral side of the bottom portion, and the first limiting assembly is connected to the bottom portion; and the first limiting members include a supporting portion configured to support the battery cell and a limiting portion to which the second limiting members are connected, the supporting portion is connected to the bottom portion, and a position of the supporting portion at the bottom portion along the second direction is adjustable.

According to an aspect of an embodiment of this application, a plurality of limiting holes spaced apart along the second direction is disposed on at least one of the bottom portion and the supporting portion, and the supporting portion is limited at the bottom portion through the limiting holes.

According to an aspect of an embodiment of this application, at least one of the supporting portion and the bottom portion includes a second waist hole extending along the second direction such that the supporting portion is fixedly connected to the bottom portion through the second waist hole.

According to an aspect of an embodiment of this application, a raising block located in the limiting space and detachably connected to the fixed frame is further included.

According to an aspect of an embodiment of this application, the raising block includes a body portion and a plug-in portion which extends from the body portion, and the raising block is plugged into the fixed frame through the plug-in portion.

According to an aspect of an embodiment of this application, a surface of the body portion is recessed toward the plug portion to form an avoidance portion such that the raising block is capable of being removed from the fixed frame through the avoidance portion.

According to an aspect of an embodiment of this application, the raising block includes at least two plug-in portions, and the avoidance portion is located between adjacent two of the plug-in portions.

In a second aspect, an embodiment of this application provides a battery formation and capacity-grading device including the battery tray according to the first aspect.

In the battery tray of the embodiments of this application, the battery tray includes a fixed frame, which improves the structural strength and increases the safety during use of the battery tray; the fixed portion is disposed in the fixed frame and includes a first limiting assembly and a second limiting assembly, the first limiting assembly includes at least two first limiting members extending along a first direction and spaced apart along a second direction, the second limiting assembly includes at least two second limiting members which are disposed along the first direction and are connected to the first limiting member to form a limiting space for accommodating a battery cell, and the limiting space formed by the first limiting members and the second limiting member functions to limit, support, and fix the battery cell; and the second limiting members are movably disposed in the first direction along the first limiting member, and when the second limiting members move along the first direction on the first limiting members, the size of the limiting space formed by the first limiting members and the second limiting members for accommodating the battery cell will be also changed, so the battery tray can accommodate battery cells having different sizes, thus improving the compatibility and versatility of the battery tray, saving replacement costs, and improving work efficiency.

BRIEF DESCRIPTION OF THE DRAWINGS

The features, advantages, and technical effects of the exemplary embodiments of this application will be described below with reference to the accompanying drawings.

FIG. 3 is a schematic structural diagram of a second limiting member of a pool tray disclosed in an embodiment of this application;

FIG. 4 is a schematic structural diagram of another second limiting member of a battery tray disclosed in an embodiment of this application;

Figure 1:
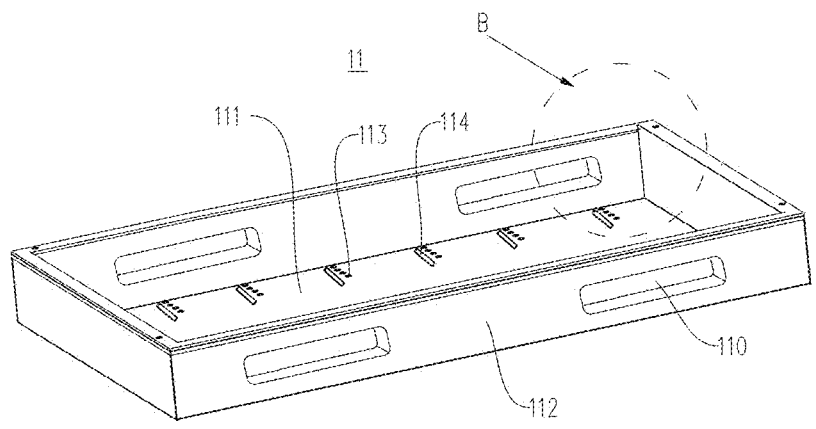
FIG. 1 is a schematic structural diagram of a fixed frame of a battery tray disclosed in an embodiment of this application.

In the drawings, the drawings are not necessarily drawn to actual scale.

REFERENCE NUMERALS 1, battery tray;

11, fixed frame; 110, hollow portion; 111, bottom portion; 112, side portion; 113, limiting hole; 114, second waist hole;

12, fixed component; 12a, first limiting assembly; 12b, second limiting assembly; 120, limiting space; 121, first limiting member; 1211, first waist hole; 1212, supporting portion; 1213, limiting portion; 1214, heat dissipation hole; 122, second limiting member; 1221, avoidance groove; 1222, connecting component; 1223, guide arc surface; 123, adjustment portion; 1231, through groove; 124, adjustment mechanism; 1241, fixed portion; 1242, sliding portion; 1243, screw; 1244, through hole; 1245, threaded hole; 1246, shaft retaining ring; 1247, retaining ring groove;

13, raising block; 130, body portion; 131, plug-in portion; 132, avoidance portion;

2, battery cell;

X, first direction; Y, second direction; Z, third direction.

DETAILED DESCRIPTION

Below, embodiments of this application will be further described in detail in combination with the drawings and embodiments. The following detailed description of the embodiments and the accompanying drawings are intended to exemplary illustrate the principles of this application and are not intended to limit the scope of this application, i.e., this application is not limited to the described embodiments.

In the description of this application, it should be noted that, unless otherwise stated, the meaning of "a plurality" is two or more; the orientation or positional relationship indicated by terms "upper", "lower", "left", "right", "inner", "outer" and the like is merely for the purpose of easily describing this application and simplifying the description and is not intended to indicate or imply that the device or assembly referred to has a particular orientation, is constructed and operated in a particular orientation, and therefore cannot be construed as limiting this application. Moreover, terms "first", "second", and the like are configured for descriptive purposes only and are not to be construed as indicating or implying relative importance. "Vertical" does not mean being vertical in the strict sense, but within the allowable range of error. "Parallel" does not mean being parallel in the strict sense, but within the allowable range of error.

The "embodiments" referred to in this application means that the specific features, structures, or characteristics described in combination with the embodiments may be contained in at least one embodiment of this application. The phrase appearing at various positions in the description does not necessarily refer to the same embodiment, or an independent or alternative embodiment exclusive of another embodiment. Those skilled in the art could explicitly and implicitly understand that an embodiment described in this application may be combined with other embodiments.

In the description of this application, it should also be noted that, unless otherwise specified and limited, terms "mounting", "connected to", and "connected with" are to be understood broadly and may be, for example, a fixed connection, a detachable connection, or an integral connection; they can be connected directly or indirectly through an intermediate medium. The specific meaning of the above terms in this application can be understood by the person skilled in the art according to specific circumstance.

At present, judging from the development of the market situation, lithium-ion batteries are widely used in electric vehicles and consumer electronics due to advantages of large energy density, high output power, long cycle life, and less environmental pollution. During the production of lithium-ion batteries, it is necessary to store and turnover finished and semi-finished lithium-ion batteries, and battery trays are commonly used tools during the storage and turnover.

The inventors of this application noticed that during the production of the batteries, the battery trays need to move between different equipment and workstations. Since different types of batteries have different size specifications, the battery trays are usually required to match different sizes and specifications.

The inventors found that due to structural limitations of the battery trays in the present market, the shape and the volume of an accommodating space of each type of battery tray are fixed, and one battery tray may only correspond to one battery having one size specification. It is necessary to replace with a different type of battery tray when the specification of the batteries is changed, so the compatibility is poor, thus increasing the replacement time and costs in the production and affecting work efficiency.

In view of the above problems found by the inventors, in order to solve the problem of poor compatibility of the battery trays, the inventors conducted intensive studies and improved the battery trays. The technical solutions described in the embodiments of this application are suitable for battery trays and various devices using the battery trays.

Various devices using battery trays include battery injection devices, battery formation devices, battery capacity grading devices, battery baking devices, static storage trays, and the like.

In this application, the battery cells may include lithium-ion battery cells, lithium-sulfur battery cells, sodium-ion battery cells, magnesium-ion battery cells, or the like. In this application, the description is made by taking a square battery cell as an example of the battery cell.

Figure 2:
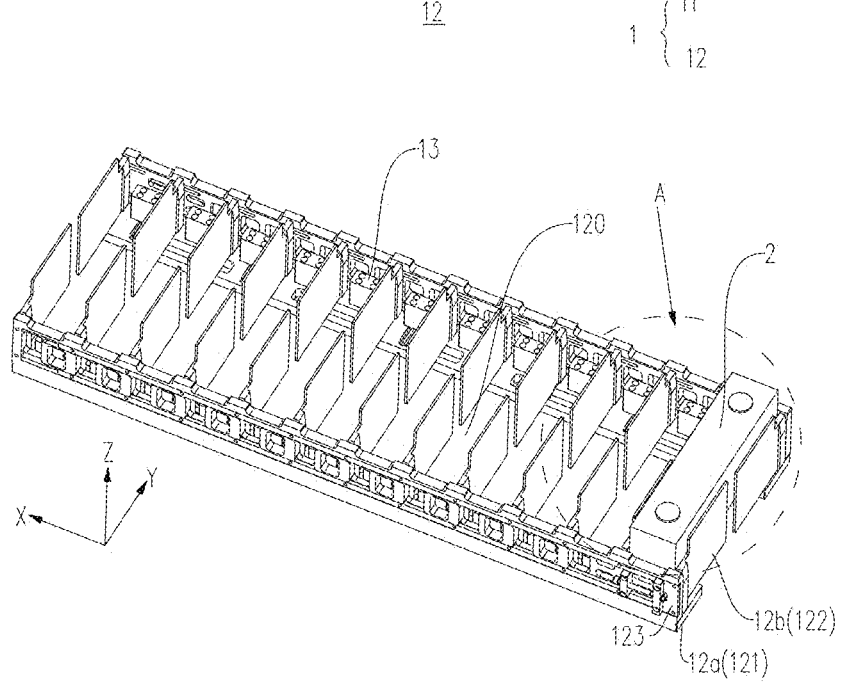
FIG. 2 is a schematic structural diagram of a fixed component of a battery tray disclosed in an embodiment of this application.

In some optional embodiments, FIG. 1 schematically discloses a schematic structural diagram of a fixed frame 11 of a battery tray 1, and FIG. 2 schematically discloses a schematic structural diagram of a fixed component 12 of a battery tray 1. As shown in FIGS. 1 and 2, a battery tray 1 includes a fixed frame 11 and a fixed component 12; and the fixed component 12 is located in the fixed frame 11 and includes a first limiting assembly 12a and a second limiting assembly 12b, the first limiting assembly includes at least two first limiting members 121 and at least two second limiting members 122, the first limiting members extend along a first direction X and are spaced apart along a second direction Y which intersects the first direction X, the second limiting assembly 12b is connected to the first limiting assembly 12a and includes at least two second limiting members 122 which are arranged along the first direction X, and the second limiting members 122 are connected to the first limiting members 121 to form a limiting space 120 for accommodating a battery cell 2 and are movably disposed in the first direction X along the first limiting members 121.

The fixed frame 11 is located outside the fixed component 12 to protect the battery cell 2, thus increasing the safety during the movement of the battery tray 1.

Optionally, the fixed frame 11 has a hollow portion 110 to facilitate handling of the battery tray 1 and also improve the heat dissipation efficiency of the battery tray 1. Optionally, the hollow portion 110 is in a rectangular shape with rounded corners.

The first limiting assembly 12a includes at least two first limiting members 121 extending along the first direction X and spaced apart along the second direction Y, and two of the first limiting members 121 spaced apart may function to fix and limit a size of the battery cell 2 in the second direction Y. As shown in FIG. 2, the first direction is an X direction, and the second direction is a Y direction. The first limiting members 121 may be baffle bars, for example.

Optionally, the first limiting member 121 is made of one or more material of polyamide-6 and 30% glass fibers, polyimide, polyamide-imide, polyetheretherketone, polytetrafluoroethylene, ultra-high molecular weight polyethylene, and polyformaldehyde, and the first limiting members should have a certain structural strength and be corrosion-resistant. The first limiting members 121 are formed by injection molding.

Optionally, a height of the first limiting members 121 may be larger than or equal to one-third of a height of the battery cell 2, so the battery cell 2 is prevented from tipping when moved with the battery tray 1.

The second limiting assembly 12b is connected to the first limiting assembly 12a, at least two second limiting members 122 arranged along the first direction X can function to fix and limit a size of the battery cell 2 in the first direction X, and the second limiting members 122 can function to isolate a faulty battery cell 2 and retard the fire when the battery cell 2 burns due to unexpected circumstances. The second limiting members 122 may be separating plates, for example. The second limiting members 122 are used to limit a position of a large surface of the battery cell 2.

Optionally, material of the second limiting members 122 is phenolic plastic or polyphenylene sulfide, polybutylene terephthalate, liquid crystal polyester, or the like, and should have a certain structural strength and be fireproof and corrosion-resistant. The second limiting members 122 are formed by injection molding.

Optionally, a height of the second limiting members 122 should be larger than or equal to one-third of a height of the battery cell 2, so the battery cell 2 is prevented from tipping when moved with the battery tray 1.

Optionally, a surface of the second limiting members 122 is provided with a fireproof foam which prevents the second limiting members 122 from scratching a surface of the battery cell 2, and the fireproof foam is also used for the buffering and the shock absorption. Optionally, a surface of the fireproof foam is printed, thus increasing the frictional force of the surface of the second limiting members 122 is increased and improving the stability of the battery cell 2 in the limiting space 120.

In the embodiments of this application, the battery tray 1 includes a fixed frame 11 for improving the structural strength and increasing the safety during use of the battery tray 1; the fixed component 12 is disposed in the fixed frame 11 and includes a first limiting assembly 12a and a second limiting assembly 12b, the first limiting assembly 12a includes at least two first limiting members 121 which extend along a first direction X and are spaced apart along a second direction Y, the second limiting assembly 12b include at least two second limiting members 122 which are arranged along the first direction and which are connected to the first limiting members 121 to form a limiting space 120 for accommodating the battery cell, and the limiting space 120 formed by the first limiting members 122 and the second limiting members 122 function to limit, support and fix the battery cell 2; and the second limiting members 122 are movably disposed in the first direction X along the first limiting members 121, and when the second limiting members 122 moves along the first direction X on the first limiting members 121, the size of the limiting space formed by the first limiting members 121 and the second limiting members 122 for accommodating the battery cell 2 maybe changed, so the battery tray 1 can accommodate battery cells 2 having different sizes, thus improving the compatibility and versatility of the battery tray 1, saving replacement costs, and improving work efficiency.

In some embodiments, as shown in FIG. 2, the second limiting assembly 12b includes two second limiting members 122 spaced apart to form a limiting space 120.

In these embodiments, the two second limiting members 122 are spaced apart to form the limiting space, so in a fixed length space, it is possible to form as many limiting spaces 120 as possible, thereby increasing the capacity of the battery tray 1.

In some embodiments, two second limiting members 122 at least partially overlap along a third direction Z which intersects the first direction X and the second direction Y.

In these embodiments, as shown in FIG. 2, the two second limiting members 122 at least partially overlap along the third direction Z and can apply opposite limiting forces in the third direction Z to the battery cell 2 located in the limiting space 120, thus preventing the battery cells 2 from tipping in the battery tray 1 and increasing the stability of the battery cells 2 in the battery tray 1.

Optionally, the two second limiting members 122 completely overlap a large surface of the battery cell, thus further improving the stability of the position of the battery cell 2 in the battery tray 1.

In some embodiments, FIG. 3 schematically discloses a schematic structural diagram of a second limiting member 122 of a battery tray 1, and FIG. 4 schematically discloses another schematic structural diagram of a second limiting member 122 of a battery tray 1. As shown in FIGS. 2 to 4, an avoidance groove 1221 is formed on at least one of the two second limiting members 122, and at least a portion of one of the two second limiting members can be located in the avoidance groove 1221 of the other of the two second limiting members The avoidance groove 1221 has a space avoidance function, space avoidance means that in manufacturing by molding, an avoidance space should be left in a case that two molds do not need to be closely engaged with each other, thus reducing the chance of interference between components and the processing difficulty in the machining stage.

Optionally, the avoidance groove 1221 maybe integrally formed when the second limiting members 122 are formed by injection molding or can be obtained by machining after the second limiting members 122 are formed.

Optionally, the avoidance grooves 1221 are disposed on two sides of the second limiting members 122 in the first direction X. The avoidance groove 1221 on a side of the second limiting members 122 facing the limiting space can function to fix the battery cell 2.

Optionally, on a surface of the second limiting members 122 facing the limiting space 120, an end of one-third of the surface in a direction facing away from the bottom portion is a convex arc surface which is called a guide arc surface 1223. The guide arc surface 1223 can enable an opening of the limiting space 120 to flare upward, that is, the two opposite guide arc surfaces 1223 forming a same limiting space 120 extend along directions away from each other in a direction away from a bottom portion of the fixed frame (not shown in the figures), thus facilitating the placement and removal of the battery cell 2.

In these embodiments, the avoidance groove 1221 has an avoidance function, thus reducing the processing difficulty of the second limiting members 122 and also avoiding jam phenomenon when the second limiting members 122 are stacked, and at least a portion of one of the second limiting members may be located in the avoidance groove 1221 of the other of the second limiting members, thus increasing the volume of the limiting space 120 and allowing the limiting space 120 to accommodate a battery cell 2 having a large size.

In some embodiments, as shown in FIGS. 2 to 4, the two second limiting members 122 forming the limiting space 120 are connected to different first limiting members 121, respectively.

In these embodiments, the two second limiting members 122 forming the limiting space 120 are connected to the different first limiting members 121, respectively, adjacent to each other, and misaligned, that is, the battery cell 2 located in the limiting space 120 is fixed in the first direction X by the second limiting members 122 connected to two different first limiting members 121, respectively. When the second limiting member 122 on one side is moved, the size of the limiting space 120 formed by a moving second limiting member 122 and a fixed second limiting member 122 will be changed as the moving second limiting member 122 on the one side moves, so the battery tray 1 can accommodate battery cells 2 having different sizes. Moreover, the size of the limiting space 120 will be changed by moving only the second limiting member 122 connected to the first limiting member 121 on one side, which is a convenient operation.

Figure 5:
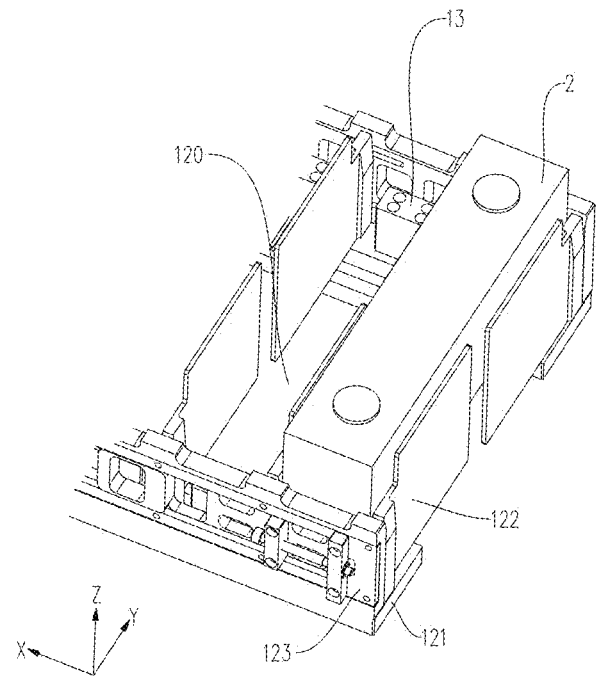
FIG. 5 is a partial enlarged structural diagram of a position A in FIG. 2 of this application.
Figure 6:
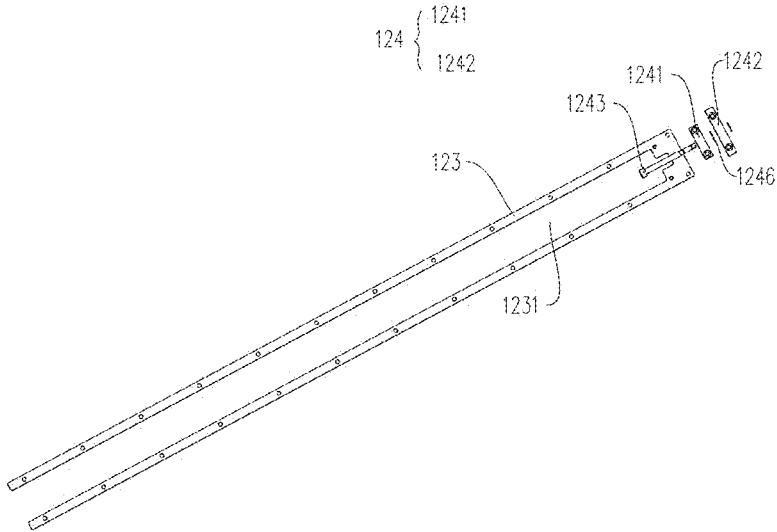
FIG. 6 is a schematic structural diagram of an adjustment portion of a battery tray disclosed in an embodiment of this application.
Figures 7, 8:
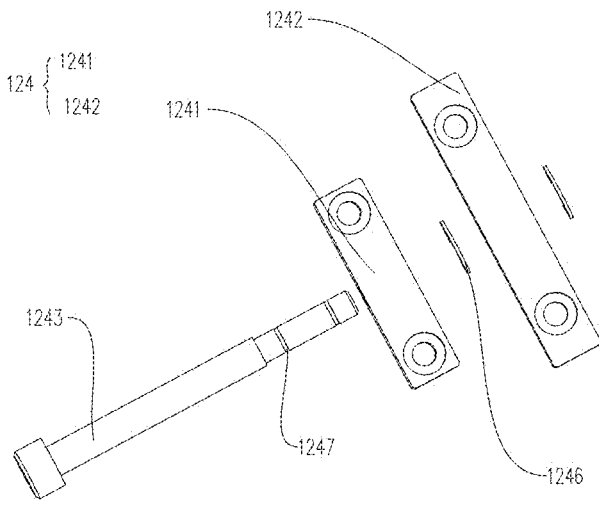
FIG. 7 is a schematic structural diagram of an adjustment mechanism of a battery tray disclosed in an embodiment of this application.
FIG. 8 is a schematic structural diagram of a fixed portion of a battery tray disclosed in an embodiment of this application.

In some embodiments, FIG. 5 schematically discloses a partial enlarged schematic structural diagram of a position A in FIG. 2, FIG. 6 schematically discloses a schematic structural diagram of an adjustment portion 123 of a battery tray 1, and FIG. 7 schematically discloses a schematic structural diagram of an adjustment mechanism 124 of a battery tray 1. As shown in FIGS. 5 to 7, the fixed component 12 further includes an adjustment portion 123 through which a plurality of second limiting member 122 are connected to at least one first limiting member 121 and which is movably disposed along the first direction X relative to the at least one first limiting member 121 such that the adjustment portion 123 can drive the second limiting members 122 to move along the first direction X.

Optionally, the adjustment portion 123 is an adjustment plate which is provided with a plurality of connecting holes that are engaged with the second limiting members 122.

Optionally, the adjustment portion 123 is made of one or more material of 304 stainless steel, 310 stainless steel, 316 stainless steel, imide, polyamide-imide, polyetheretherketone, polytetrafluoroethylene, ultra-high molecular weight polyethylene and polyformaldehyde, and the adjustment portion 123 should have a certain strength and be corrosion-resistant; and the adjustment portion 123 can be formed by machining or injection molding.

Optionally, the adjustment portion 123 may be connected to the second limiting members 122 by riveting, gluing, threading, or the like.

Optionally, the adjustment portion 123 is located on a side of the first limiting members 121 facing the limiting space and does not occupy a space outside the fixed frame (not shown in the figures). The first limiting members 121 are provided with a sinking groove which matches the adjustment mechanism, the adjustment portion 123 is located in the sinking groove to prevent the adjustment portion 123 from obstructing the limiting space 120 to accommodate the battery cell 2, and the second limiting members 122 are connected to the first limiting members 121 by the adjustment portion 123.

Optionally, the adjustment portion 123 is located on a side of the first limiting members 121 facing away from the limiting space 120, and the adjustment portion 123 located on the outside is easy to operate. The first limiting members 121 are provided with a sinking groove which matches the adjustment portion 123 and in which the adjustment portion 123 is located, thus improving the aesthetics. Moreover, the built-in adjustment portion 123 can also prevent the operator from being accidentally scratched by the adjustment mechanism 123, thus improving the safety of the battery tray 1, and the second limiting members 122 are connected to the adjustment mechanism 123 through the first limiting members 121.

In these embodiments, the plurality of second limiting members 122 are connected to at least one first limiting member 121 through the adjustment portion 123 which is movably disposed along the first direction relative to the first limiting member 121, so when moved in the first direction relative to the first limiting members 121, the adjustment portion 123 can simultaneously drive the plurality of second limiting members 122 to move, thereby synchronously changing the sizes of a plurality of limiting spaces 120.

In some embodiments, as shown in FIGS. 5 and 6, there are two adjustment portions 123 for driving a plurality of second limiting members 122 to be connected to respective first limiting members 121 such that the plurality of second limiting members 122 can move in opposite directions in the first direction.

In these embodiments, as shown in FIGS. 5 and 6, there are two adjustment portions 123 for driving a plurality of second limiting members 122 to be connected to respective first limiting members 121. By adjusting the two adjustment portions 123 in opposite directions, such as by adjusting the two adjustment portions 123 to move closely to or away from each other, the two adjustment portions moving in opposite directions can drive the plurality of second limiting members 122 to move in opposite directions along the first direction X, so the positions of the second limiting members 122 and the size of the limiting space 120 can be quickly changed and the changeover time can be shortened.

In some embodiments, the fixed component 12 also includes an adjustment mechanism 124 for driving the adjustment portion 123 to move along the first limiting members 121, the adjustment mechanism includes a fixed portion 1241 fixedly connected to the first limiting member 124 and a sliding portion 1242 fixedly connected to the adjustment portion 123, and the fixed portion 1241 and the sliding portion 1242 are relatively movably disposed along the first direction X, such that the sliding portion 1242 can drive the adjustment portion 123 to move.

Optionally, the adjustment mechanism 124 is made of one or more material of 304 stainless steel or 310 stainless steel, 316 stainless steel, imide, polyamide-imide, polyetherether-ketone, polytetrafluoroethylene, ultra-high molecular weight polyethylene and polyformaldehyde, and the optional adjustment mechanism 124 and the adjustment portion 123 are made of the same material.

Optionally, the fixed portion 1241 is connected to the first limiting members 121 by any one of welding, riveting, gluing or bolting.

Optionally, the sliding portion 1242 is connected to the adjustment portion 123 by any one of welding, riveting, gluing or bolting.

In these embodiments, the fixed portion 1241 is fixedly connected to the first limiting members 121, the sliding portion 1242 is fixedly connected to the adjustment portion 123, and the fixed portion 1241 and the sliding portion 1242 are relatively movably disposed along the first direction X. When the sliding portion 1242 moves in the first direction X relative to the fixed portion 1241, the adjustment portion 123 fixedly connected to the fixed portion 1241 can also carry the second limiting members 122 connected to the adjustment portion 123 to move. Thus, the adjustment mechanism 124 can conveniently and quickly control the movement of the adjustment portion 123 and thus the movement of the second limiting members 122, so the operation is simplified to shorten the changeover time and thus improve the work efficiency.

In some embodiments, as shown in FIGS. 5 and 6, the adjustment portion 123 is provided with a through groove 1231 in which the fixed portion 1241 is located and fixedly connected to the first limiting members 121.

Optionally, the size of the fixed portion 1241 in the third direction is smaller than the size of the through groove 1231 to prevent the fixed portion 1241 from hindering the movement of the adjustment portion 123.

In these embodiments, the adjustment portion 123 is provided with a through groove 1231, thus saving costs. The fixed portion 1241 is located in the through groove 1231, thus saving a space occupied by the fixed portion 1241. Furthermore, compared to a case that the fixed portion 1241 is connected to the first limiting members 121 outside the slot 1231, the volume of the fixed portion 1241 is reduced and the connection strength between the fixed portion 1241 and the first limiting members 121 increases in a case that the fixed portion 1241 is connected to the first limiting members 121 in the through groove 1231.

Figure 9:
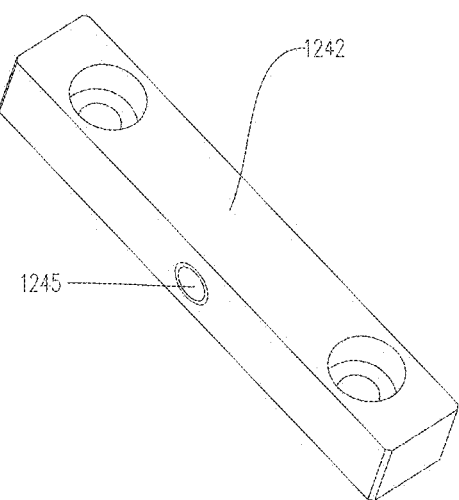
FIG. 9 is a schematic structural diagram of a sliding portion of a battery tray disclosed in an embodiment of this application.
Figure 10:
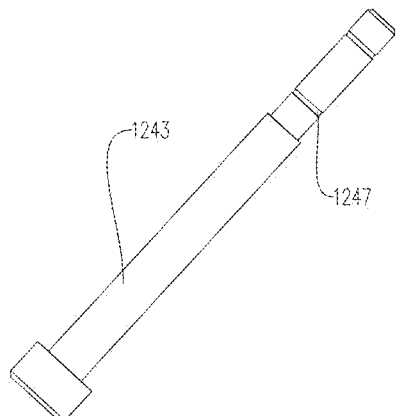
FIG. 10 is a schematic structural diagram of a screw of a battery tray disclosed in an embodiment of this application.

In some embodiments, FIG. 8 schematically discloses a schematic structural diagram of a fixed portion 1241 of a battery tray 1, FIG. 9 schematically discloses a schematic structural diagram of a sliding portion 1242 of a battery tray 1, and FIG. 10 schematically discloses a schematic structural diagram of a screw 1243 of a battery tray 1. As shown in FIGS. 6 to 10, the fixed portion 1241 and the sliding portion 1242 are connected through a screw 1243.

In some other embodiments, the fixed portion 1241 and the sliding portion 1242 are connected through a restoring member which is reciprocally deformable along the first direction X.

The positions between the fixed portion 1241 and the sliding portion 1242 are adjusted by the screw 1243. Optionally, the fixed portion 1241 is provided with a through hole 1244 which matches a threaded hole 1245 on the sliding portion 1242, and the screw 1243 passes through the through hole 1244 of the fixed portion 1241 into the threaded hole 1245 of the sliding portion 1242. When the screw 1243 is screwed into the threaded hole 1245, a distance between the fixed portion 1241 and the sliding portion 1242 is shortened and the adjustment portion 123 moves in the first direction X along the first limiting member, and optionally, the screw 1243 is an adjustment bolt.

Optionally, the sliding portion 1242 is provided with a through hole 1244 that matches the threaded hole 1245 on the fixed portion 1241, and the screw 1243 passes through the through hole 1244 of the sliding portion 1242 into the threaded hole 1245 of the fixed portion 1241. When the screw 1243 is screwed into the threaded hole 1245, a distance between the fixed portion 1241 and the sliding portion 1242 is shortened, and the adjustment portion 123 moves in the first direction X along the first limiting member.

Optionally, the size of the threaded portion of the screw 1243 in the first direction X is not smaller than the size of the adjacent second limiting member on the same first limiting member in the first direction so as to enable the screw 1243 to adjust the movement of the sliding portion 1242 to the maximum extent.

Retaining ring grooves 1247 are provided at two ends of a threaded portion of the screw 1243, and used to be engaged with shaft retaining rings 1246 which can be used for axial fixation, that is, to prevent the screw 1243 from turning out of or excessively in the threaded hole 1245 which would otherwise cause damage to the adjustment portion 123.

Optionally, the restoring member that is reciprocally deformable along the first direction X may be a slide rail assembly, a gear assembly, a connecting rod assembly, an elastically deformable body portion, or the like.

In these embodiments, the fixed portion 1241 and the sliding portion 1242 are connected through the screw or the reciprocally deformable member to ensure that the size of the limiting space can be continuously adjusted, thus adapting to accommodation requirements of a variety of battery cells having different sizes.

Figure 11:
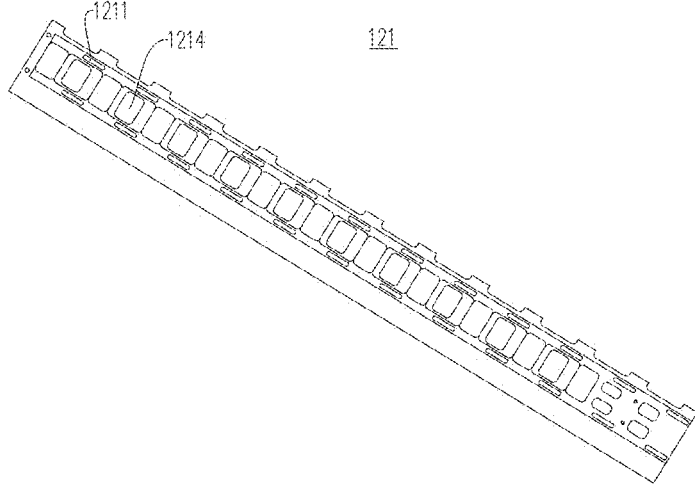
FIG. 11 is a schematic structural diagram of a first limiting member of a battery tray disclosed in an embodiment of this application.
Figure 12:
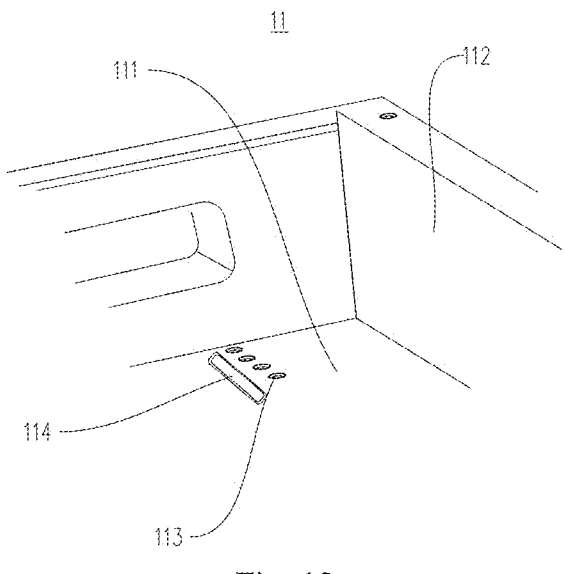
FIG. 12 is a partial enlarged structural diagram of a position B in FIG. 1 of this application.
Figure 13:
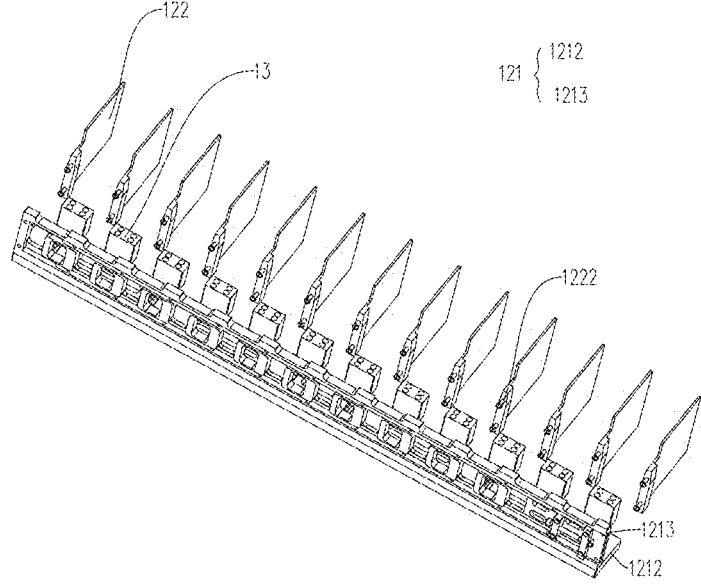
FIG. 13 is an exploded diagram of a partial structure of a battery tray disclosed in an embodiment of this application.

In some embodiments, FIG. 11 schematically discloses a schematic structural diagram of a first limiting member 121 of a battery tray 1, FIG. 12 schematically discloses a partial enlarged schematic structural diagram of a position B in FIG. 1, and FIG. 13 schematically discloses an exploded diagram of a partial structure of a battery tray. As shown in FIGS. 11 to 13, the second limiting members 122 and the adjustment portion 123 are provided on two sides of the first limiting members 121 in the second direction Y, respectively, and the second limiting members 122 are provided with a connecting component 1222 for connecting the adjustment portion 123; and the first limiting members 121 are provided with first waist holes 1211 extending in the first direction, and the connecting component 1222 is connected to the adjustment portion 123 through the first waist holes 1211.

Optionally, only one connecting component 1222 passes through each of the first waist holes 1211, the size of the first waist hole 1211 in the first direction is not smaller than the size X of adjacent second limiting members 122 on the first limiting members 121 in the first direction X, so the size of the first waist hole 1211 is small, thus ensuring the structural strength of the first limiting members 121.

Optionally, more than n connecting components 1222 pass through each of the first waist holes 1211, wherein n is an integer, and the size of the first waist hole 1211 in the first direction X is not larger than (n+1) times the size of adjacent second limiting members 122 on the first limiting members 121 in the first direction X, and the number of the first waist holes 1211 provided on the first limiting members 121 are small, so the processing difficulty is low.

Optionally, the connecting component 1222 can be formed by injection molding together with the second limiting members 122, or can be obtained by machining after the second limiting members 122 are formed.

In these embodiments, the second limiting members 122 are provided with the connecting component 1222 for connecting the adjustment portion 123, thus improving the connection strength between the second limiting members 122 and the adjustment portion 123; and the first limiting members 121 are provided with the first waist holes 1211 extending along the first direction X, thus providing space for position adjustment of the second limiting members 122 and allowing for continuous adjustment of the second limiting members 122 within the first waist holes 1211.

In some embodiments, as shown in FIGS. 1 and 2, a position of at least one first limiting member 121 relative to the fixed frame 11 in the second direction is adjustable.

In these embodiments, the position of at least one first limiting member 121 relative to the fixed frame 11 along the second direction Y is adjustable, and the size of the limiting space 120 in the second direction Y may be changed by adjusting the position of the first limiting members 121, so the battery tray 1 can accommodate battery cells 2 having different sizes in the second direction Y, thereby improving the compatibility of the battery tray 1.

Figure 14:
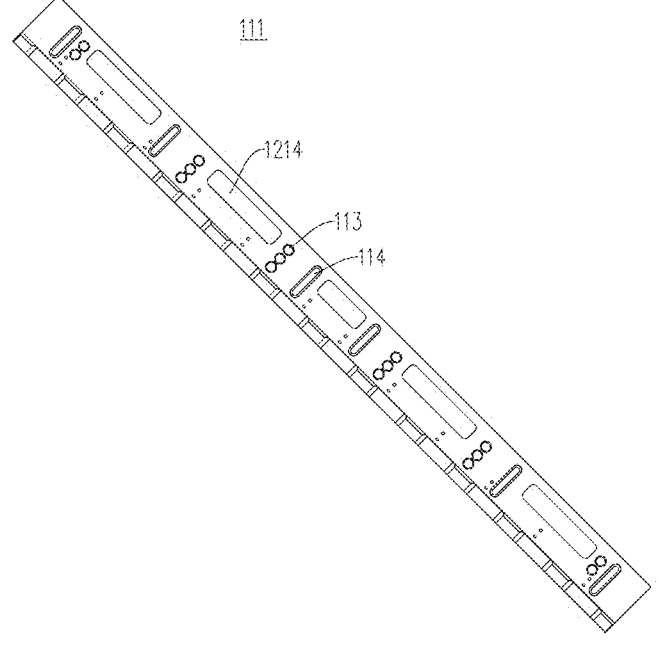
FIG. 14 is a partial schematic structural diagram of a bottom portion of a fixed frame of a battery tray disclosed in an embodiment of this application.

In some embodiments, FIG. 14 schematically discloses a partial structural diagram of a bottom portion 111 of a fixed frame of a battery tray 1. As shown in FIGS. 12 to 14, the fixed frame 11 includes a bottom portion 111 and a side portion 112 connected to a peripheral side of the bottom portion 111, and the first limiting assembly is connected to the bottom portion 111; and the first limiting member includes a supporting portion 1212 for supporting the battery cell 2 and a limiting portion 1213 to which the second limiting members 122 are connected, the supporting portion 1212 is connected to the bottom portion 111, and the position of the bottom portion 111 in the second direction is adjustable.

Optionally, the bottom portion 111 and the side portion 112 of the fixed frame 11 are integrally formed, so the fixed frame 11 has high structural strength.

Optionally, the bottom portion 111 and the side portion 112 of the fixed frame 11 are detachably connected together, and the connection may be achieved by riveting, bonding or bolting. The detachable connection of the bottom portion 111 and the side portion 112 of the fixed frame 11 avoids deformation of the fixed frame 11 caused by welding and also facilitates storage and handling.

Optionally, the supporting portion 1212 and the limiting portion 1213 of the first limiting members 121 are integrally formed and the structural strength is high.

Optionally, the supporting portion 1212 and the limiting portion 1213 are detachably connected together, and the connection may be achieved by riveting, bonding or bolting. The detachable connection between the supporting portion 1212 and the limiting portion 1213 avoids structural deformation caused by welding and also facilitates storage and handling.

In these embodiments, the bottom portion 111 of the fixed frame 11 can function to support the fixed component 12, and the side portion 112 of the fixed frame 11 can function to protect and limit the fixed component 12; the first limiting members 121 include the supporting portion 1212 and the limiting portion 1213, and the second limiting member 122 is connected to the limiting portion 1213 which functions to limit and is connected to the second limiting members 122 to form the limiting space 120; and the supporting portion 1212 is used to support the battery cell 2 and connected to the bottom portion 111, and the position of the supporting portion 1212 on the bottom portion 111 is adjustable along the second direction Y. When moved in the second direction Y, the supporting portion 1212 can carry the limiting portion 1213 to move in the second direction Y, and the size of the limiting space 120 in the second direction Y may be changed due to the movement of the limiting portion 1213 relative to the bottom portion 111 in the second direction Y, so the limiting space 120 can accommodate the battery cells 2 having different sizes in the second direction Y.

In some embodiments, as shown in FIGS. 12 to 14, at least one of the bottom portion 111 and the supporting portion 1212 is provided with a plurality of limiting holes 113 spaced apart along the second direction Y, and the supporting portion 1212 is limited at the bottom portion 111 through the limiting holes 113.

Optionally, at least one of the bottom portion 111 or the supporting portion 1212 is provided with positioning pins corresponding to the limiting holes 113, and the positioning pins are engaged with the limiting holes 113 to achieve the function of fixing and positioning of the bottom portion 111 and the supporting portion 1212.

Optional, the positioning pin is made of one or more material of polyamide-6 and 30% glass fiber, polyimide, polyamide-imide, polyetheretherketone, polytetrafluoroethylene, ultra-high molecular weight polyethylene, and polyformaldehyde, and the positioning pins are formed by injection molding.

Optionally, adjacent limiting holes 113 are equally spaced apart to facilitate adjustment of the supporting portion 1212 in the second direction Y.

In these embodiments, at least one of the bottom portion 111 and the supporting portion 1212 is provided with the plurality of limiting holes 113 spaced apart along the second direction Y, the limiting holes 113 play a role of positioning for the supporting portion 1212 at the bottom portion 111, and the supporting portion 1212 is adjustable relative to the bottom portion 111 in the second direction Y by being engaged with different limiting holes 113.

In some embodiments, as shown in FIGS. 12 to 14, at least one of the supporting portion 1212 and the bottom portion 111 includes a second waist hole 114 extending along the second direction Y such that the supporting portion is fixedly connected to the bottom portion by the second waist hole 114.

Optionally, the size of the second waist hole 114 in the second direction Y is the same as half the size of the second limiting members 122 in the second direction Y, that is, the supporting portion 1212 is movable in the second direction Y to the maximum extent, and the structural strength will not be reduced, because the second waist hole 114 is not too large.

In these embodiments, at least one of the supporting portion 1212 and the bottom portion 111 includes the second waist hole 114 extending along the second direction Y, the supporting portion 1212 and the bottom portion 111 can be fixedly connected through the second waist hole 114, the second waist hole 114 is designed in such a manner that when the supporting portion 1212 moves relative to the bottom portion 111 in the second direction Y, the fixed position between them is easily adjusted, and also the second waist hole 114 improves the heat dissipation capacity of the battery tray.

Figure 15:
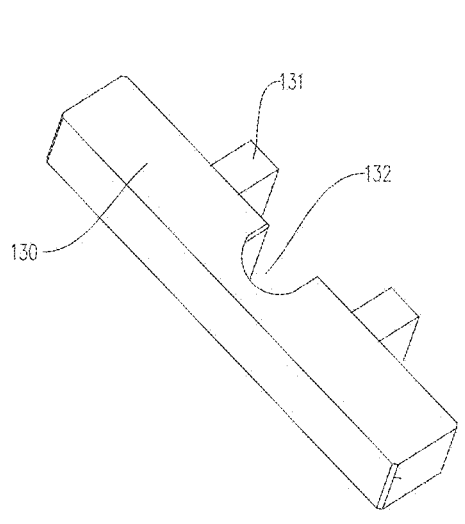
FIG. 15 is a schematic structural diagram of a raising block of a battery tray disclosed in an embodiment of this application.

In some embodiments, FIG. 15 schematically discloses a schematic structural diagram of a raising block 13 of a battery tray 1. As shown in FIGS. 2 and 15, a raising block 13, which is located in the limiting space 120 and detachably connected to the fixed frame, is also included.

Optionally, material of the raising block 13 is polyamide-6 and one or more of 30% glass fiber or polyimide, polyamide-imide, polyetheretherketone, polytetrafluoroethylene, ultra-high molecular weight polyethylene, and polyformaldehyde. Optionally, the raising block 13 is formed by injection molding. Optionally, material of the raising block 13 is the same as that of the first limiting member.

In these embodiments, in a case that the size of the battery cell 2 in the third direction Z is too small to facilitate subsequent operations, the raising block 13 can provide support for the battery cell 2, so the raising block 13 can enable the limiting space 120 to accommodate battery cells 2 having different sizes in the third direction Z.

In some embodiments, as shown in FIG. 15, the raising block 13 includes a body portion 130 and a plug-in portion 131 extending from the body portion 130 such that the raising block 13 can be plugged into the fixed frame through the raising block 13.

Optionally, the fixed frame has a plug hole which is engaged with the plug-in portion 131 which can improve the heat dissipation effect of the battery tray.

In these embodiments, compared to a plug-in portion 131 extending from the fixed frame, the plug-in portion 131 extending from the body portion of the raising block 13 can avoid the impact on the fixed component in a case that the plug-in portion 131 is disposed on the fixed frame; and the raising block 13 can be plugged into the fixed frame through the plug-in portion 131, thereby improving the connection strength between the raising block 13 and the fixed frame.

In some embodiments, as shown in FIG. 15, a surface of the body portion 130 toward the plug-in portion 131 is recessed to form an avoidance portion 132 such that the raising block 13 can be removed from the fixed frame through the avoidance portion 132.

In these embodiments, the surface of the body portion 130 toward the plug-in portion 131 is recessed to form the avoidance portion 132 such that the raising block 13 can be easily replaced through the avoidance portion 132.

In some embodiments, as shown in FIG. 15, the raising block 13 includes at least two plug-in portions 131 between which the avoidance portion 132 is located.

In these embodiments, more than two plug-in portions 131 can provide high connection strength, and the avoidance portion 132 is located between the two adjacent plug-in portions 131, thus facilitating operation.

An embodiment of this application also provides a battery formation and capacity-grading device which includes the battery tray of any one of the above embodiments.

The battery formation and capacity-grading device provided by an embodiment of this application uses the battery tray provided by any one of the above embodiments and thus has the same technical effect, which will not be described again here.

As shown in FIGS. 1 to 15, according to some embodiments of this application, this application provides a battery tray 1 which includes a fixed frame 11, a fixed component 12, and a raising block 13; the fixed component 12 is located in the fixed frame 11 and includes a first limiting assembly 12a, a second limiting assembly 12b, and an adjustment portion 123; the first limiting assembly includes at least two first limiting members 121 and at least two second limiting members 122, the first limiting members extend along a first direction X and are spaced apart along a second direction Y which intersects the first direction X, and the second limiting assembly 12b is connected to the first limiting assembly 12a and includes at least two second limiting members 122 which are arranged along the first direction X, the two second limiting members 122 spaced apart are connected to the first limiting members 121 to form a limiting space 120 for accommodating a battery cell 2, the two second limiting members 122 spaced apart are movably disposed in the first direction X along the first limiting members 121, the two second limiting members 122 spaced apart all overlap along the third direction Z, the two second limiting members 122 spaced apart is provided with an avoidance groove 1221, one of the two second limiting members may be completely located in the avoidance groove 1221 of the other of the two second limiting members, the third direction Z intersects the first direction X and the second direction Y, and the two second limiting members 122 forming the limiting space are connected to different first limiting members 121, respectively; there are two adjustment portions 123, and a connecting portion 1222 is provided on the second limiting members 122, the connecting portion 1222 on the second limiting member 122 is connected to the adjustment portion 123 through a first waist hole 1211 on the first limiting members 121, and the adjustment portions 123 can drive a plurality of second limiting members 122 to move in the opposite direction along the first direction, respectively; the adjustment mechanism 124 includes a fixed portion 1241 and a sliding portion 1242, the adjustment portion 123 are provided with a through groove 1231 in which the fixed portion 1241 is located and connected to the first limiting members 121, the sliding portion 1242 is connected to the adjustment portion 123, and the fixed portion 1241 and the sliding portion 1242 are connected by a screw; the position of at least one first limiting member 121 relative to the fixed frame 11 along the second direction is adjustable, the first limiting members 121 include a supporting portion 1212 and a limiting portion 1213, the second limiting members 122 are connected to the limiting portion 1213, at least one of the supporting portion 1212 and the bottom portion 111 is provided with a plurality of limiting holes 113 spaced apart along the second direction Y and a second waist hole 114 extending along the second direction Y; and the raising block 13 is detachably connected to the fixed frame 11 and includes a body portion 130 and at least two plug-in portions 131 extending from the body portion 130, and an avoidance portion 132, which is formed by recession of a surface of the body portion 130 toward the plug-in portion 131, is disposed between two adjacent plug-in portions 131.

In these embodiments of this application, the battery tray 1 includes a fixed frame 11 for improving the structural strength and increasing the safety during use of the battery tray 1; the fixed component 12 is disposed in the fixed frame 11 and includes a first limiting assembly 12a and a second limiting assembly 12b, the first limiting assembly 12a includes at least two first limiting members 121 which extend along a first direction X and are spaced apart along a second direction Y, the second limiting assembly 12b include at least two second limiting members 122 which are arranged along the first direction and which are connected to the first limiting members 121 to form a limiting space 120 for accommodating the battery cell, and the limiting space 120 formed by the first limiting members 122 and the second limiting members 122 function to limit, support and fix the battery cell 2; and the second limiting members 122 are movably disposed in the first direction along the first limiting members 121, and when the second limiting members 122 moves along the first direction X on the first limiting members 121, the size of the limiting space formed by the first limiting members 121 and the second limiting members 122 for accommodating the battery cell 2 maybe changed, so the battery tray 1 can accommodate battery cells 2 having different sizes, thus improving the compatibility and versatility of the battery tray 1, saving replacement costs, and improving work efficiency.

Although this application has been described with reference to embodiments, various modifications can be made thereto and components therein can be replaced with equivalents without departing from the scope of the present disclosure. Especially, as long as there is no structural conflict, technical features mentioned in various embodiments can be combined in any manner. This application is not limited to the specific embodiments disclosed herein, but includes all technical solutions falling within the scope of the claims.

What is claimed is:

1. A battery tray, comprising
   a fixed frame; and
   a fixed component located in the fixed frame, the fixed component comprising a first limiting assembly and a second limiting assembly, the first limiting assembly comprising at least two first limiting members which extend along a first direction respectively and are spaced apart along a second direction which intersects the first direction, the second limiting assembly being connected to the first limiting assembly and comprising at least two second limiting members which are disposed along the first direction and are connected with the first limiting members to form a limiting space for accommodating a battery cell, and the second limiting members being movably disposed along the first limiting members in the first direction;
   wherein the second limiting assembly comprises two second limiting members spaced apart to form the limiting space,
   the fixed component further comprises an adjustment portion through which a plurality of second limiting members are connected to at least one of the first limiting members, and the adjustment portion is movably disposed along the first direction relative to the first limiting members so as to drive the second limiting members to move along the first direction through the adjustment portion,
   the second limiting members and the adjustment portion are disposed on two sides of the first limiting members in the second direction, respectively, and a connecting component configured to connect the adjustment portion is disposed on the second limiting members, and a first waist hole extending along the first direction is disposed on the first limiting members, and the connecting component is connected to the adjustment portion through the first waist hole.

2. The battery tray according to claim 1, wherein the two second limiting members at least partially overlap along a third direction which intersects the first direction and the second direction.

3. The battery tray according to claim 1, wherein the two second limiting members forming the limiting space are connected to different first limiting members, respectively.

4. The battery tray according to claim 1, wherein the fixed component further comprises an adjustment mechanism which is configured to drive the adjustment portion to move along the first limiting members, the adjustment mechanism comprises a fixed portion fixedly connected to the first limiting members and a sliding portion fixedly connected to the adjustment portion, and the fixed portion and the sliding portion are relatively movably disposed along the first direction such that the sliding portion is capable of driving the adjustment portion to move.

5. The battery tray according to claim 4, wherein the adjustment portion is provided with a through groove in which the fixed portion is located and fixedly connected to the first limiting member;

and/or wherein the fixed portion and the sliding portion are connected by a screw or by a restoring member which is deformable reciprocally along the first direction.

6. The battery tray according to claim 1, wherein a position of at least one of the first limiting members relative to the fixed frame along the second direction is adjustable.

7. The battery tray of claim 6, wherein the fixed frame comprises a bottom portion and a side portion connected to a peripheral side of the bottom portion, and the first limiting assembly is connected to the bottom portion; and the first limiting members comprise a supporting portion configured to support the battery cell and a limiting portion to which the second limiting members are connected, the supporting portion is connected to the bottom portion, and a position of the supporting portion at the bottom portion along the second direction is adjustable.

8. The battery tray according to claim 7, wherein a plurality of limiting holes spaced apart along the second direction is disposed on at least one of the bottom portion and the supporting portion, and the supporting portion is limited at the bottom portion through the limiting holes;

and/or wherein at least one of the supporting portion and the bottom portion comprises a second waist hole extending along the second direction such that the supporting portion is fixedly connected to the bottom portion through the second waist hole.

9. The battery tray according to claim 1, further comprising a raising block located in the limiting space and detachably connected to the fixed frame.

10. The battery tray according to claim 9, wherein the raising block comprises a body portion and a plug-in portion which extends from the body portion, and the raising block is plugged into the fixed frame through the plug-in portion;

wherein a surface of the body portion is recessed toward the plug portion to form an avoidance portion such that the raising block is capable of being removed from the fixed frame through the avoidance portion; and wherein the raising block comprises at least two plug-in portions, and the avoidance portion is located between adjacent two of the plug-in portions.

11. A battery formation and capacity-grading device comprising the battery tray according to claim 1.

* * * * *